US010809216B2

United States Patent
Ban

(10) Patent No.: US 10,809,216 B2
(45) Date of Patent: Oct. 20, 2020

(54) GAS SENSOR AND METHOD FOR MANUFACTURING THE SAME, AND DETECTION DEVICE

(71) Applicant: BOE TECHNOLOGY GROUP CO., LTD., Beijing (CN)

(72) Inventor: Shengguang Ban, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 232 days.

(21) Appl. No.: 15/935,934

(22) Filed: Mar. 26, 2018

(65) Prior Publication Data

US 2019/0120783 A1  Apr. 25, 2019

(30) Foreign Application Priority Data

Oct. 23, 2017  (CN) .......................... 2017 1 0991795

(51) Int. Cl.
*G01R 27/08* (2006.01)
*G01N 27/12* (2006.01)

(52) U.S. Cl.
CPC ......... *G01N 27/129* (2013.01); *G01N 27/128* (2013.01)

(58) Field of Classification Search
CPC .. G01N 27/127; G01N 27/128; G01N 27/129; G01N 27/404; G01N 27/4045; G01N 27/4074; G01N 27/4075; G01N 27/4141; G01N 27/4163; G01N 33/0036; G01N 33/0037; G01N 33/0039; G01N 33/004; G01N 33/0042; G01N 33/0044; G01N 33/0045; G01N 33/005; G01N 33/0052; G01N 33/0054; G01N 33/0055
See application file for complete search history.

(56) References Cited

U.S. PATENT DOCUMENTS

| | | | | |
|---|---|---|---|---|
| 8,525,129 | B2 * | 9/2013 | Offermans | B82Y 20/00 250/458.1 |
| 8,551,310 | B2 * | 10/2013 | Wang | G01N 27/12 204/431 |
| 9,304,094 | B2 * | 4/2016 | Myung | G01N 27/4074 |
| 2010/0012919 | A1 * | 1/2010 | Park | G01N 27/12 257/9 |

(Continued)

FOREIGN PATENT DOCUMENTS

| CN | 101435795 A | 5/2009 |
|---|---|---|
| CN | 101905904 A1 | 12/2010 |

(Continued)

OTHER PUBLICATIONS

Second Office Action in CN Appl. No. 201710991795.0, dated Sep. 12, 2019.

(Continued)

*Primary Examiner* — Thang X Le
(74) *Attorney, Agent, or Firm* — Dinsmore & Shohl LLP

(57) ABSTRACT

The present description provides a gas sensor, a method for manufacturing the same and a detection device. The gas sensor includes: an insulation substrate, a gas sensitive element, a first electrode and a second electrode. The gas sensitive element is disposed on the insulation substrate and has a three-dimensional nano network structure. The first electrode and the second electrode are located on opposite sides of the gas sensitive element.

5 Claims, 3 Drawing Sheets

(56) References Cited

U.S. PATENT DOCUMENTS

| | | | |
|---|---|---|---|
| 2012/0009089 A1* | 1/2012 | Yu | B82Y 15/00 |
| | | | 422/98 |
| 2016/0169824 A1* | 6/2016 | Shin | G01N 27/125 |
| | | | 73/31.06 |
| 2018/0031532 A1* | 2/2018 | Lee | H01L 21/0242 |

FOREIGN PATENT DOCUMENTS

| | | |
|---|---|---|
| CN | 102757095 A | 10/2012 |
| CN | 103267779 A | 8/2013 |
| CN | 105548274 A | 5/2016 |
| CN | 106066351 A | 11/2016 |
| CN | 106908496 A | 6/2017 |

OTHER PUBLICATIONS

First Office Action in CN Appl. No. 201710991795.0, dated May 22, 2019.

Jin, et al., "Preparation and application status of metal hollow microspheres", School of Materials Science & Engineering, Sichuan University, Chengdu, China, Proceedings of the 6th China Academic Conference on Functional Materials and Applications, Dec. 31, 2007, pp. 4112.

\* cited by examiner

GAS SENSOR AND METHOD FOR MANUFACTURING THE SAME, AND DETECTION DEVICE

CROSS-REFERENCE TO RELATED APPLICATIONS

The present application claims priority to and the benefit of China Patent Application No. 201710991795.0 filed on Oct. 23, 2017, the disclosure of which is incorporated by reference herein in its entirety.

TECHNICAL FIELD

The present disclosure relates to a gas sensor and a method for manufacturing the same, and a detection device.

BACKGROUND

With the development of society and science and technology, sensor technology has become more and more important. Sensor technology, computer technology and communication technology are referred to as three major pillars of information technology.

Gas sensors, as a branch of the sensor technology, are widely used in various fields, and are getting more and more attention as well. In the field of food, gas sensors are used in the studies of such as food storage effect, fermentation control, and poultry salmonella. In the field of environment, the increasingly serious smog has a greater impact on people's normal life and health, and the generation of smog has an important relationship with the emission of related gases. Therefore, it has become important to detect gas emission using gas sensors. Gas sensors are also widely used in other fields, such as safety inspection of inflammable and explosive items, aerospace, military affairs, and national defense.

SUMMARY

According to one aspect of embodiments of the present disclosure, a gas sensor is provided. The gas sensor comprises: an insulation substrate; a gas sensitive element disposed on the insulation substrate and having a three-dimensional nano network structure; and a first electrode and a second electrode located on opposite sides of the gas sensitive element.

According to another aspect of embodiments of the present disclosure, a detection device which comprises a gas sensor provided by any embodiment of the present disclosure is provided.

According to still another aspect of embodiments of the present disclosure, a method for manufacturing a gas sensor is provided. The method comprises: providing an insulation substrate; forming a gas sensitive element having a three-dimensional nano network structure on the insulation substrate; and forming a first electrode and a second electrode on opposite sides of the gas sensitive element.

Other features, aspects and advantages of the present disclosure will become apparent from the following detailed description of exemplary embodiments of the present disclosure with reference to the accompanying drawings.

BRIEF DESCRIPTION OF THE DRAWINGS

The accompanying drawings, which constitute part of this specification, illustrate exemplary embodiments of the present disclosure and, together with this specification, serve to explain the principles of the present disclosure, in which.

Figure 1:
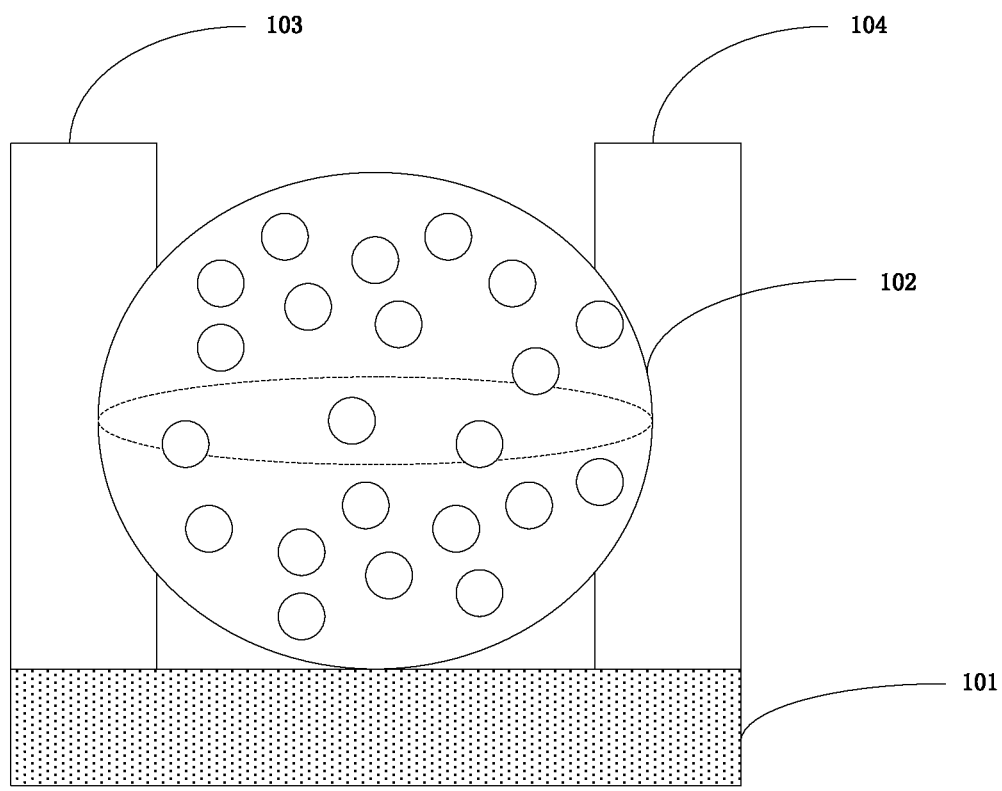
FIG. 1 is a schematic structural view showing a gas sensor according to some embodiments of the present disclosure.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

Gas sensitive elements having gas sensitive characteristics used in gas sensors are mostly made of thin film materials.

Thin film materials have relatively small specific surface area. When a thin film material is used as a gas sensitive element, only the surface of the thin film has gas sensitive characteristics. That is, except the surface, the remaining portion of the thin film does not have gas sensitive characteristics, which is unfavorable for flow and adsorption of a target gas to be detected. Therefore, a gas sensor with a thin film as a gas sensitive element has a lower sensitivity.

In view of the above problem, the present disclosure proposes the following solutions.

FIG. 1 is a schematic structural view showing a gas sensor according to some embodiments of the present disclosure.

As shown in FIG. 1, the gas sensor may comprise an insulation substrate 101, a gas sensitive element 102, a first electrode 103 and a second electrode 104.

The insulation substrate 101 may be formed, for example, by an insulating material such as alumina, silicon oxide, or silicon nitride. In some embodiments, the insulation substrate 101 may be a flexible insulation substrate which is formed, for example, by a material selected from polyimide resin, polyetheretherketone, or transparent conductive polyester.

The gas sensitive element 102 is disposed on the insulation substrate 101 and has a three-dimensional nano network structure.

The first electrode 103 and the second electrode 104 are located on opposite sides of the gas sensitive element 102. The first electrode 103 and the second electrode 104 may be formed, for example, by a conductive material such as conductive silver paste, silver or copper.

In practical applications, the three-dimensional nano network structure may be formed by a semiconductor material such as a metal oxide semiconductor. An exemplary working mechanism of a gas sensor will be introduced below by taking a three-dimensional nano network structure formed by a n-type semiconductor material (for example, $SnO_2$) as an example.

In the case where a three-dimensional nano network structure is exposed to air, oxygen molecules will be adsorbed on the surface of the three-dimensional nano network structure. These oxygen molecules adsorbed on the surface of the three-dimensional nano network structure will capture the electrons inside the three-dimensional nano network structure and become oxygen anion group. A thin depletion layer on the surface of the three-dimensional nano network structure is generated as the electrons on the surface are consumed, which increases the resistance of the three-dimensional nano network structure.

In the case where the three-dimensional nano network structure is exposed to a target gas (in this case, a reducing gas), the reducing gas will react with the oxygen anion group, so that the electrons will return to the three-dimensional nano network structure and the depletion layer will disappear, which decreases the resistance of the three-dimensional nano network structure.

A change in resistance of the three-dimensional nano network structure can be detected by the first electrode 103 and the second electrode 104. In general, a gas sensor can detect a corresponding target gas. Upon a change in resistance of the three-dimensional nano network structure is detected, it is determined that a target gas has been detected. Target gases of different concentrations will cause different changes in resistance of the three-dimensional nano network structure, so the concentration of a target gas can be identified according to the changes in resistance of the three-dimensional nano network structure.

It should be explained that the first electrode 103 and the second electrode 104 can be positioned according to the actual situation, so long as they are located on opposite sides of the gas sensitive element 102 and can detect changes in resistance of the gas sensitive element 102.

In the above embodiments, the gas sensitive element has a three-dimensional nano network structure. The three-dimensional nano network structure has a larger specific surface area relative to thin film material and can adsorb more gas when exposed to air, so that a depletion layer having a larger area can be formed. Therefore, when the three-dimensional nano network structure is exposed to a target gas, the disappearance of the depletion layer can result in a greater change in resistance, thereby the sensitivity of the gas sensor can be improved. In addition, the three-dimensional nano network structure is also helpful for the transmission of gas, thereby the response time and the recovery time of the gas sensor can be reduced.

In some implementations, referring to FIG. 1, the three-dimensional nano network structure may comprise a hollow nanosphere that defines a plurality of holes. Optionally, the hollow nanosphere may be formed, for example, by polystyrene (PS). It should be understood that although FIG. 1 illustrates circular holes, this is merely schematically and not intended to limit the scope of the present disclosure. In some implementations, the holes can be in an oval, polygonal, or irregular shape, or the like. It should also be understood that the hollow nanosphere can be a sphere, ellipsoid, or cone, or the like.

It should be pointed out that the hollow nanosphere that defines a plurality of holes is only one exemplary implementation of the three-dimensional nano network structure, and the present disclosure is not limited thereto. In other implementations, the three-dimensional nano network structure can also be a network structure in other shapes, such as cuboid-like shape or cylinder-like shape.

According to some embodiments of the present disclosure, the hollow nanosphere may comprise a plurality of semiconductor nanosheets, wherein any two adjacent nanosheets overlap to form the hollow nanosphere, and each of the semiconductor nanosheets defines one or more holes. In some embodiments, each of the semiconductor nanosheets defines only one hole. In other embodiments, each of the semiconductor nanosheets defines more than one holes. In still other embodiments, each of some semiconductor nanosheets defines only one hole, and each of other semiconductor nanosheets defines more than one hole. In some embodiments, the semiconductor nanosheets may be formed by a metal oxide such as cadmium oxide, or zinc oxide. In some other embodiments, the semiconductor nanosheets may also formed by another semiconductor material such as cadmium sulfide.

Figure 2A:
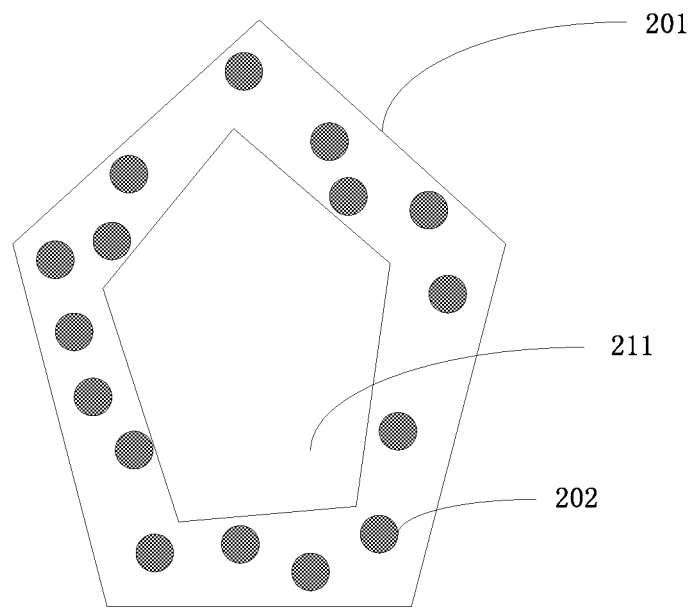
FIG. 2A is a schematic diagram showing a semiconductor nanosheet that defines only one hole.
Figure 2B:
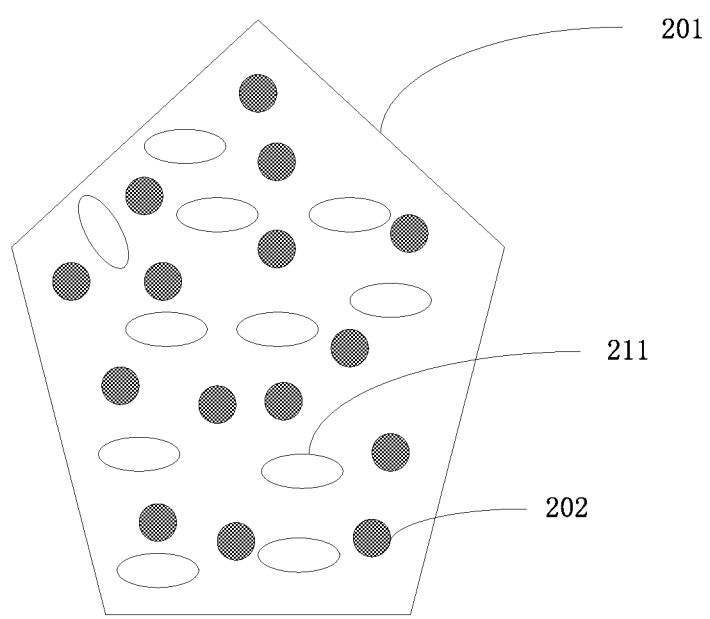
FIG. 2B is a schematic diagram showing a semiconductor nanosheet that defines more than one hole.

FIG. 2A is a schematic diagram showing a semiconductor nanosheet that defines only one hole. FIG. 2B is a schematic diagram showing a semiconductor nanosheet that defines more than one hole.

For example, all of the semiconductor nanosheets 201 constituting the hollow nanosphere each may define only one hole 211 as shown in FIG. 2A. As another example, all of the semiconductor nanosheets 201 constituting the hollow nanosphere each may define more than one hole 211 as shown in FIG. 2B. As still another example, some of the semiconductor nanosheets 201 constituting the hollow nanosphere may be as shown in FIG. 2A, and other semiconductor nanosheets 201 may be as shown in FIG. 2B.

In the case where a semiconductor nanosheet 201 that denies only one hole 211, the only one hole 211 occupies, for example, more than half of the semiconductor nanosheet 201 where the only one hole 211 is located. A three-dimensional nano network structure having a semiconductor nanosheet 201 that defines such a hole 211 is helpful for stress relief, so that a flexible gas sensor to which this three-dimensional nano network structure is applied can obtain more excellent gas sensitivity property.

It should be understood that although the semiconductor nanosheet shown in FIGS. 2A and 2B is in pentagon shape, it is not intended to limit the scope of the present disclosure. In other embodiments, the semiconductor nanosheet can also be in other shapes.

In order to further improve the sensitivity, in some embodiments, the gas sensor may further comprise a nanoparticle in contact with the three-dimensional nano network structure. In some embodiments, the nanoparticle may comprise a semiconductor nanoparticle, such as p-type NiO or n-type ZnO nanoparticle. In some other embodiments, the nanoparticle may comprise a metal nanoparticle such as Ag, Au, or Pt nanoparticle. Exemplarily, the nanoparticle may have a size of 5 nm to 50 nm, such as 10 nm, 20 nm, 25 nm, or 40 nm. Here, the contact of a nanoparticle with a three-dimensional nano network structure may form a heterojunction or a Schottky junction. In the case where both the nanoparticle and the three-dimensional nano network structure are formed by semiconductor materials, the contact therebetween may form a heterojunction. In the case where one of the nanoparticle and the three-dimensional nano network structure is formed by a metal material and the other is formed by a semiconductor material, the contact therebetween may form a Schottky junction.

Referring to FIGS. 2A and 2B, in the case where the three-dimensional nano network structure is a hollow nanosphere constituted by semiconductor nanosheets 201, the semiconductor nanosheets 201 may be coated with nanoparticles 202 that are in contact with the semiconductor nanosheet 201 to form heterojunctions or Schottky junctions.

In the above embodiments, a nanoparticle is in contact with a three-dimensional nano network structure, which forms a heterojunction or a Schottky junction. The heterojunction or Schottky junction has a depletion layer that can be in communication with the depletion layer formed when the three-dimensional nano network structure is exposed to air. Therefore, when the three-dimensional nano network structure is exposed to a target gas, the disappearance of the depletion layer may result in a further greater change in resistance, thereby the sensitivity of the gas sensor can be further improved.

Figure 3:
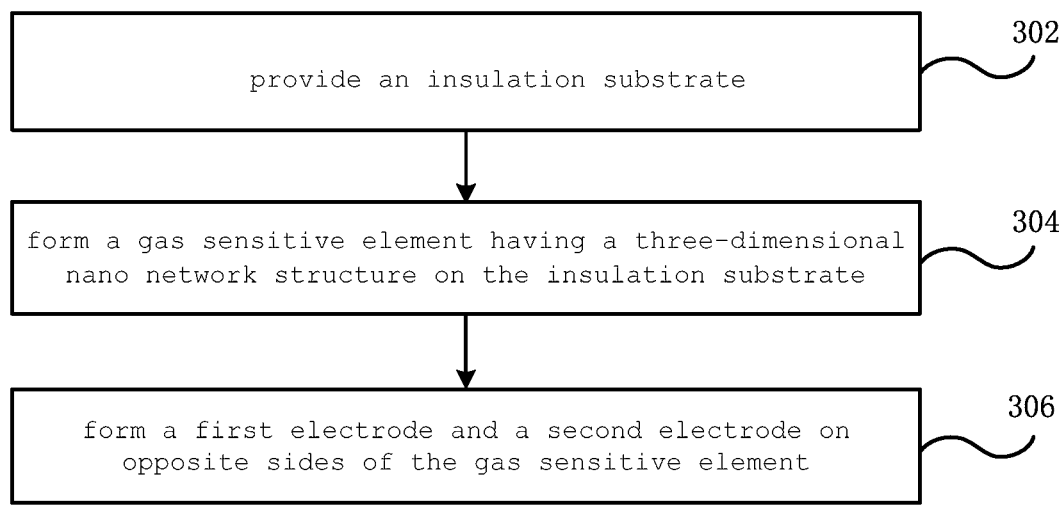
FIG. 3 is a schematic flow chart illustrating a method for manufacturing a gas sensor according to some embodiments of the present disclosure.

FIG. 3 is a schematic flow chart illustrating a method for manufacturing a gas sensor according to some embodiments of the present disclosure.

At step 302, an insulation substrate is provided. In some embodiments, the insulation substrate may be a flexible insulation substrate.

At step 304, a gas sensitive element having a three-dimensional nano network structure is formed on the insulation substrate.

As a non-limiting implementation, the three-dimensional nano network structure may comprise a hollow nanosphere that defines a plurality of holes, such as a PS sphere or a hollow nanosphere constituted by semiconductor nanosheets. In other implementations, the three-dimensional nano network structure may also be a network structure in other shapes, such as cuboid-like shape or cylinder-like shape.

In some embodiments, a nanoparticle may be further coated on the three-dimensional nano network structure to form a heterojunction or a Schottky junction. For example, nanoparticles may be formed by hydrothermal method; and then the nanoparticles are added to deionized water, for example, 5 g nanoparticles can be added to deionized water of 50 mL; after that, the nanoparticles may be spin-coated on a three-dimensional nano network structure. The rotation speed of spin coating may be, for example, 400-600 r/min, such as 450 r/min, or 500 r/min.

At step 306, a first electrode and a second electrode are formed on opposite sides of the gas sensitive element.

For example, an electrode material such as Ag or Au may be coated on opposite sides of the gas sensitive element to form the first electrode and the second electrode. The first electrode and the second electrode can be formed by the same material or different materials.

In the above embodiments, a gas sensitive element having a three-dimensional nano network structure is formed. The three-dimensional nano network structure has a larger specific surface area relative to thin film material and can adsorb more gas when exposed to air, so that a depletion layer having a larger area can be formed. Therefore, when the three-dimensional nano network structure is exposed to a target gas, the disappearance of the depletion layer can result in a greater change in resistance, thereby the sensitivity of the gas sensor can be improved. In addition, the three-dimensional nano network structure is also helpful for the transmission of gas, thereby the response time and the recovery time of the gas sensor can be reduced.

The above hollow nanosphere that defines holes can be formed in different implementations, two of which are given below by way of example.

One implementation of forming a hollow nanosphere that defines holes is described below.

First, a nanosphere, such as a PS sphere, is formed on an insulation substrate. Then, a corrosive liquid (such as nitric acid, or sulfuric acid) is injected into the nanosphere to form a hollow nanosphere. After that, the hollow nanosphere formed after injecting the corrosive liquid may be heated to define a plurality of holes.

Next, another implementation of forming a hollow nanosphere that defines holes will be described.

First, a plurality of semiconductor nanosheets are formed on an insulation substrate, and any two adjacent nanosheets of the semiconductor nanosheets overlap to form a hollow nanosphere.

For example, the semiconductor nanosheets may be formed using an anodized aluminum oxide template. The anodized aluminum oxide template can be obtained by anodizing aluminum in an acidic electrolyte. Due to the dissolution of aluminum by electrolyte, a porous membrane having a unique structure can be formed when an aluminum is anodized in the acidic electrolyte. The membrane cells of the porous membrane are closely packed in a hexagonal arrangement and each has a nano-scale pore in its center. These pores are uniform in size, substantially perpendicular to the surface of the insulation substrate, and parallel to each other. The size of pore of the anodized aluminum oxide template can be flexibly controlled by changing oxidation condition(s). For example, the size of pore of the anodized aluminum oxide template can be controlled by adjusting electrolytic voltages in different electrolytes. After the anodized aluminum oxide template is obtained, it can be used to controllably form semiconductor nanosheets using methods such as electrochemical method or chemical vapor deposition (CVD) method.

As another example, the semiconductor nanosheets may be directly formed by CVD method. An introduction of forming cadmium oxide nanosheets will be given below as an example. First, a cadmium sulfide powder may be placed in a CVD tube furnace and an insulation substrate may be placed at a distance of 20-50 cm (such as 30 cm, or 40 cm) from the cadmium sulfide powder. Then, the temperature of the tube furnace can be raised to about 550° C., thereby a cadmium oxide nanosheet array can be obtained on the insulation substrate.

As still another example, the semiconductor nanosheets can be formed by hydrothermal method. An introduction of still forming cadmium oxide nanosheets will be given below as an example. First, a cadmium chloride solution (having a concentration of 0.1 mol/L for example) is added to a thiourea solution (having a concentration of 0.1 mol/L for example) to form a first mixed solution. Then, a triethanolamine solution which accounts for a certain proportion (for example, five percent) of the volume of the first mixed solution is added to the first mixed solution to form a second mixed solution. After that, the pH of the second mixed solution is adjusted to about 11-12 to obtain a deposition liquid. Then, an insulation substrate is put into the above deposition liquid, and cadmium oxide nanosheets can be obtained after about 3 hours at room temperature.

After semiconductor nanosheets such as cadmium oxide nanosheets are formed, the semiconductor nanosheets can be treated by self-assembly method, hydrothermal method, laser synthesis method, or the like to form a hollow nanosphere.

Thereafter, the plurality of semiconductor nanosheets may be heated or chemically etched such that each of the plurality of semiconductor nanosheets defines one or more holes.

For example, the plurality of semiconductor nanosheets may be heated at a temperature of 450° C. to 500° C., such as 480° C., or 490° C. The holding time after heating can be 0.5 h to 1 h, such as 0.6 h, or 0.8 h.

As another example, the plurality of semiconductor nanosheets can be chemically etched in hydrogen peroxide for a time of 30 seconds to about 2 minutes, for example, about 1 minute.

Different implementations of forming a hollow nanosphere that defines holes have been described above with reference to specific examples. However, these implementations are merely exemplary. In practical applications, a hollow nanosphere that defines holes as a three-dimensional nano network structure may also be formed in other ways, which will not be listed exhaustively herein.

Figure 4:
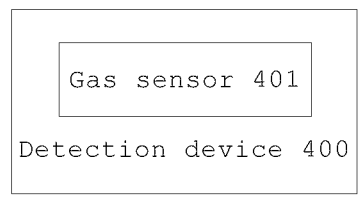
FIG. 4 is a schematic structural view showing a detection device according to some embodiments of the present disclosure.

FIG. 4 is a schematic structural view showing a detection device according to some embodiments of the present disclosure. Referring to FIG. 4, the detection device 400 may comprise the gas sensor 401 according to any above embodiment. Optionally, the detection device 400 may further comprise other sensors, such as a temperature sensor, a humidity sensor. In some implementations, various sensors in the detection device 400 can be integrated together. In some other implementations, the various sensors in the detection device 400 can be provided separately.

Hereto, various embodiments of the present disclosure have been described in detail. Some details well known in the art are not described to avoid obscuring the concept of the present disclosure. According to the above description, those skilled in the art would fully know how to implement the technical solutions disclosed herein. Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. A gas sensor, comprising:
   an insulation substrate;
   a gas sensitive element disposed on the insulation substrate and having a three-dimensional nano network structure; and
   a first electrode and a second electrode located on opposite sides of the gas sensitive element,
   wherein the three-dimensional nano network structure comprises a hollow nanosphere that defines a plurality of holes, the hollow nanosphere comprising a plurality of semiconductor nanosheets, wherein any two adjacent semiconductor nanosheets of the plurality of semiconductor nanosheets overlap each other, and each of the plurality of semiconductor nanosheets defines one or more holes, and
   wherein at least one of the plurality of semiconductor nanosheets defines only one hole, the only one hole occupying more than half of a semiconductor nanosheet of the at least one of the plurality of semiconductor nanosheets, where the only one hole is located.

2. The gas sensor according to claim 1, further comprising:
   a nanoparticle in contact with the three-dimensional nano network structure to form one of a heterojunction and a Schottky junction.

3. The gas sensor according to claim 2, wherein, the nanoparticle has a size of 5 nm to 50 nm.

4. The gas sensor according to claim 1, wherein, the insulation substrate is a flexible insulation substrate.

5. A detection device comprising the gas sensor according to claim 1.

* * * * *